US010248918B2

(12) United States Patent
Bastide et al.

(10) Patent No.: US 10,248,918 B2
(45) Date of Patent: *Apr. 2, 2019

(54) BALANCING A WORKLOAD BASED ON COMMITMENTS TO PROJECTS

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US); Dale M. Schultz, Limerick, ME (US); Shunguo Yan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 491 days.

This patent is subject to a terminal disclaimer.

(21) Appl. No.: 14/820,329

(22) Filed: Aug. 6, 2015

(65) Prior Publication Data

US 2016/0173437 A1 Jun. 16, 2016

Related U.S. Application Data

(63) Continuation of application No. 14/566,570, filed on Dec. 10, 2014.

(51) Int. Cl.
*G06Q 10/06* (2012.01)
*G06Q 10/10* (2012.01)
(Continued)

(52) U.S. Cl.
CPC ..... *G06Q 10/06311* (2013.01); *G06Q 10/103* (2013.01); *H04L 12/1822* (2013.01); *H04L 51/34* (2013.01)

(58) Field of Classification Search
CPC ...................................................... G06Q 10/06
See application file for complete search history.

(56) References Cited

U.S. PATENT DOCUMENTS 7,720,720 B1 * 5/2010 Sharma ................. G06Q 30/02
705/26.7
8,738,414 B1 * 5/2014 Nagar ................. G06Q 10/103
705/7.12
(Continued)

FOREIGN PATENT DOCUMENTS

WO 2001017276 A2 3/2001

OTHER PUBLICATIONS

List of IBM Patents or Patent Applications Treated as Related, Nov. 11, 2015, pp. 1-2.

*Primary Examiner* — Kurtis Gills
(74) *Attorney, Agent, or Firm* — Fabian VanCott; Steven L. Nichols

(57) ABSTRACT

Balancing a workload based on commitments to projects includes monitoring messages in a collaboration system, the messages representing correspondences between users of the collaboration system, selecting a number of the users associated with the collaboration system to form a group of users, retrieving the messages from each of the users in the group of users, analyzing data associated with the messages to determine which of the messages relate to at least one project, and executing, based on a threshold, at least one action to optimize a workload for at least one user in the group of users for the at least one project.

18 Claims, 6 Drawing Sheets

(51) Int. Cl.
*H04L 12/58* (2006.01)
*H04L 12/18* (2006.01)

(56) References Cited

U.S. PATENT DOCUMENTS

| | | | |
|---|---|---|---|
| 2008/0028031 A1* | 1/2008 | Bailey | G06Q 10/10 709/207 |
| 2008/0229214 A1* | 9/2008 | Hamilton | H04L 67/22 715/751 |
| 2009/0292578 A1 | 11/2009 | Danis et al. | |
| 2010/0153377 A1* | 6/2010 | Rajan | G06F 17/30528 707/723 |
| 2012/0198355 A1* | 8/2012 | Lau | G06Q 10/10 715/752 |
| 2013/0073487 A1* | 3/2013 | Reisman | G06F 17/30 706/12 |
| 2014/0146961 A1* | 5/2014 | Ristock | H04M 3/5234 379/265.12 |
| 2014/0310132 A1* | 10/2014 | Culver | G06F 17/5004 705/26.81 |

\* cited by examiner

BALANCING A WORKLOAD BASED ON COMMITMENTS TO PROJECTS

BACKGROUND

The present invention relates to balancing a workload, and more specifically, to balancing a workload based on commitments to projects.

A collaboration system includes a number of systems. The collaboration system may include systems such as electronic mail (email) systems, instant messaging (IM) systems, and social network systems. The collaborative system may further include a collaborative workspace, development tools and/or document authoring tools. The systems of the collaboration system are used to connect users to information in a logical and organized manner to enable sharing and processing of the information between the users in the form of messages. The messages may be displayed to the users via an inbox, a wall, an activity stream, a timeline, a profile, or other forms.

BRIEF SUMMARY

A method for balancing a workload based on commitments to projects includes monitoring messages in a collaboration system, the messages representing correspondences between users of the collaboration system, selecting a number of the users associated with the collaboration system to form a group of users, retrieving the messages from each of the users in the group of users, analyzing data associated with the messages to determine which of the messages relate to at least one project, and executing, based on a threshold, at least one action to optimize a workload for at least one user in the group of users for the at least one project.

A system for balancing a workload based on commitments to projects includes a monitoring engine to monitor messages in a collaboration system, the messages representing correspondences between users of the collaboration system, a selecting engine to select a number of the users associated with the collaboration system to form a group of users, a retrieving engine to retrieve the messages from each of the users in the group of users, an analyzing engine to analyze data associated with the messages to determine which of the messages relate to at least one project, a cost determining engine to determine a cost for the at least one project, a commitment determining engine to determine a commitment for each of the users in the group of users for the at least one project, a calculating engine to calculate a threshold, the threshold representing a maximum of the commitment that each of the users specifies for the at least one project, and an executing engine to execute, based on the threshold, at least one action to optimize a workload for at least one user in the group of users for the at least one project.

A computer program product includes a computer readable storage medium, the computer readable storage medium having computer readable program code embodied therewith. The computer readable program code having computer readable program code to select a number of users associated with a collaboration system to form a group of users, retrieve messages from each of the users in the group of users, analyze data associated with the messages to determine which of the messages relate to at least one project, and execute, based on a threshold, at least one action to optimize a workload for at least one user in the group of users for the at least one project.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
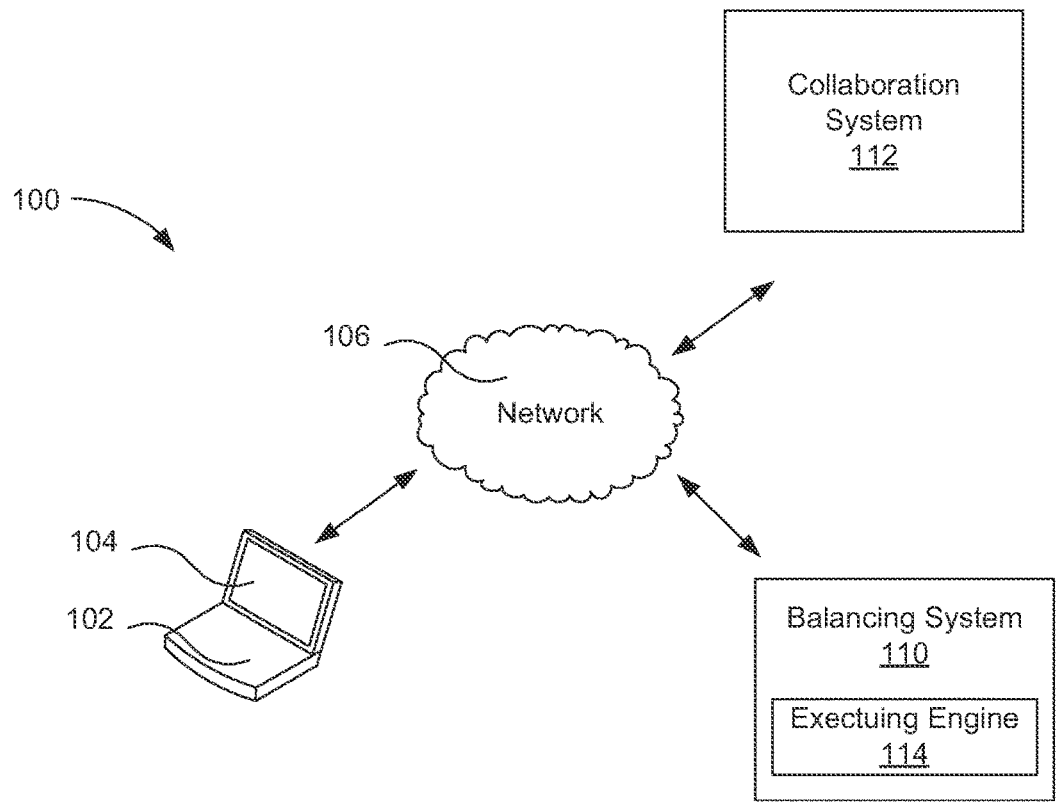
FIG. 1 is a diagram of an example of a system for balancing a workload based on commitments to projects, according to one example of principles described herein.

The present specification describes a method and system for balancing a workload based on commitments to projects, such that an action may be executed, based on a threshold, to optimize a workload for at least one user in a group of users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a collaboration system includes a number of systems. The collaboration system may include systems such as electronic mail (email) systems, instant messaging (IM) systems, and social network systems. The collaborative system may further include a collaborative workspace, development tools and/or document authoring tools. The systems of the collaboration system are used to connect users to information in a logical and organized manner to enable sharing and processing of the information between the users in the form of messages. A message may include a project in the form of an assignment, source code for the assignment, a document, or communications about the project. The messages may be displayed to the users via an inbox, a wall, an activity stream, a timeline, a profile, or in other forms. This allows users to share information with other users and gather information from the other users.

Often, users are assigned projects via messages in the systems above. Further, managers oversee that each of the users are completing the projects. However, managers may assume each project is being worked on by each user until a next project is assigned to each of the users. The act of assuming each project is being worked on by each user may result in unbalanced workloads for the users. The unbalanced workloads may result in issues such as delays for completing a project. This act can result in delays for future projects.

The principles described herein include a system and a method for balancing a workload based on commitments to projects. Such a system and method includes monitoring messages in a collaboration system, the messages representing correspondences between users of the collaboration system, selecting a number of the users associated with the collaboration system to form a group of users, retrieving the messages from each of the users in the group of users, analyzing data associated with the messages to determine which of the messages relate to at least one project, and executing, based on a threshold, at least one action to optimize a workload for at least one user in the group of users for the at least one project. Such a method and system allows an action to be executed, based on a threshold, to optimize a workload for at least one user in a group of users. As a result, a workload for the user in the group of users is rebalanced.

In the specification and appended claims, the term "collaboration system" means an email system, a social network system, an IM system, a collaborative development system, a document authoring system, or combinations thereof. The collaboration system uses inboxes, walls, activity streams, timelines, profiles, or other forms to display messages to allow users to send and receive messages.

In the specification and appended claims, the term "group of users" means a number of users associated with a project in a collaboration system. The project may be assigned to the group of users. Further, the group of user may have the same report to chain, such as all the users in a group of users report to a specific manager. The group of user may be selected via a project team list, a distribution list, a custom list, a network list, other lists, or combinations thereof.

In the specification and appended claims, the term "message" means an electronic correspondence between users of the collaboration system. A message may include text, data, images, digital media, source code, documents, or combinations thereof. Further, the messages may be in the form of email, chat, postings, other forms, or combinations thereof.

In the specification and appended claims, the term "project" means a goal that a group of users are to achieve. A project may include a number of tasks. The tasks may be logical stages used to complete the project. Further, users may be assigned a project via messages.

In the specification and appended claims, the term "commitment" means a percentage of a user's workload dedicated to a project. A user may specify the commitment as a minimum percentage or a maximum percentage.

In the present specification and appended claims, the term "threshold" means a maximum of a commitment a user specifies for a project. Once a threshold is reached, an action is executed to optimize a workload associated with the user.

As used in the present specification and appended claims, the term "action" is meant to be broadly understood as a method, routine, or computer implemented code that optimizes a workload associated with a user. An action may include rebalancing a workload, redirecting a message, sending notifications, hiding a message, other actions, or combinations thereof.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of an example of a system for balancing a workload based on commitments to projects, according to one example of principles described herein. As will be described below, a balancing system is in communication with a network to monitor messages in a collaboration system, the messages representing correspondences between users of the collaboration system. The balancing system further selects a number of the users associated with the collaboration system to form a group of users. Further, the balancing system retrieves the messages from each of the users in the group of users. The balancing system further analyzes data associated with the messages to determine which of the messages relate to at least one project. Further, the balancing system executes, based on a threshold, at least one action to optimize a workload for at least one user in the group of users for the at least one project.

As illustrated in FIG. 1, the system (100) includes a collaboration system (112). The collaboration system (112) may include an email system, a social network system, an IM system, or combinations thereof. As will be described in other parts of this specification, the collaboration system (112) uses inboxes, walls, activity streams, timelines, or profiles to allow users to send and receive messages.

As depicted in FIG. 1, the system (100) includes a balancing system (110). The balancing system (110) monitors messages in a collaboration system (112), the messages representing correspondences between users of the collaboration system (112). The balancing system (110) may monitor all messages in the collaboration system (112). Alternatively, the balancing system (110) may monitor specific messages, such as unread messages, in the collaboration system (112).

Further, the balancing system (110) selects a number of the users associated with the collaboration system (112) to form a group of users. As will be described in FIG. 3, a user interface (UI) may be presented to a manger to allow a manager to select the users.

The balancing system (110) further retrieves the messages from each of the users in the group of users. The messages that the balancing system (110) retrieves may include all the messages associated with the group of users that the balancing system (110) monitors.

Further, the balancing system (110) analyzes the data associated with the messages to determine which of the messages relate to at least one project. The data of the messages may include owners, senders, recipients, a body for each of the messages, metadata, or combinations thereof.

The balancing system (110) further executes, based on a threshold, at least one action to optimize a workload for at least one user in the group of users for the at least one project. An executing engine (114) of the balancing system (110) may execute, based on the threshold, the at least one action to optimize the workload for the at least one user in the group of users for the at least one project. Such a system (100) allows an action to be executed, based on a threshold, to optimize the workload for at least one user in a group of users. As a result, the workload for the user in the group of users is rebalanced.

While this example has been described with reference to the balancing system being operated over the network, the balancing system may be stored and operated locally on a single machine. For example, the balancing system may be integrated into a user or client device, a server, a database, other locations, or combinations thereof.

Figure 2:
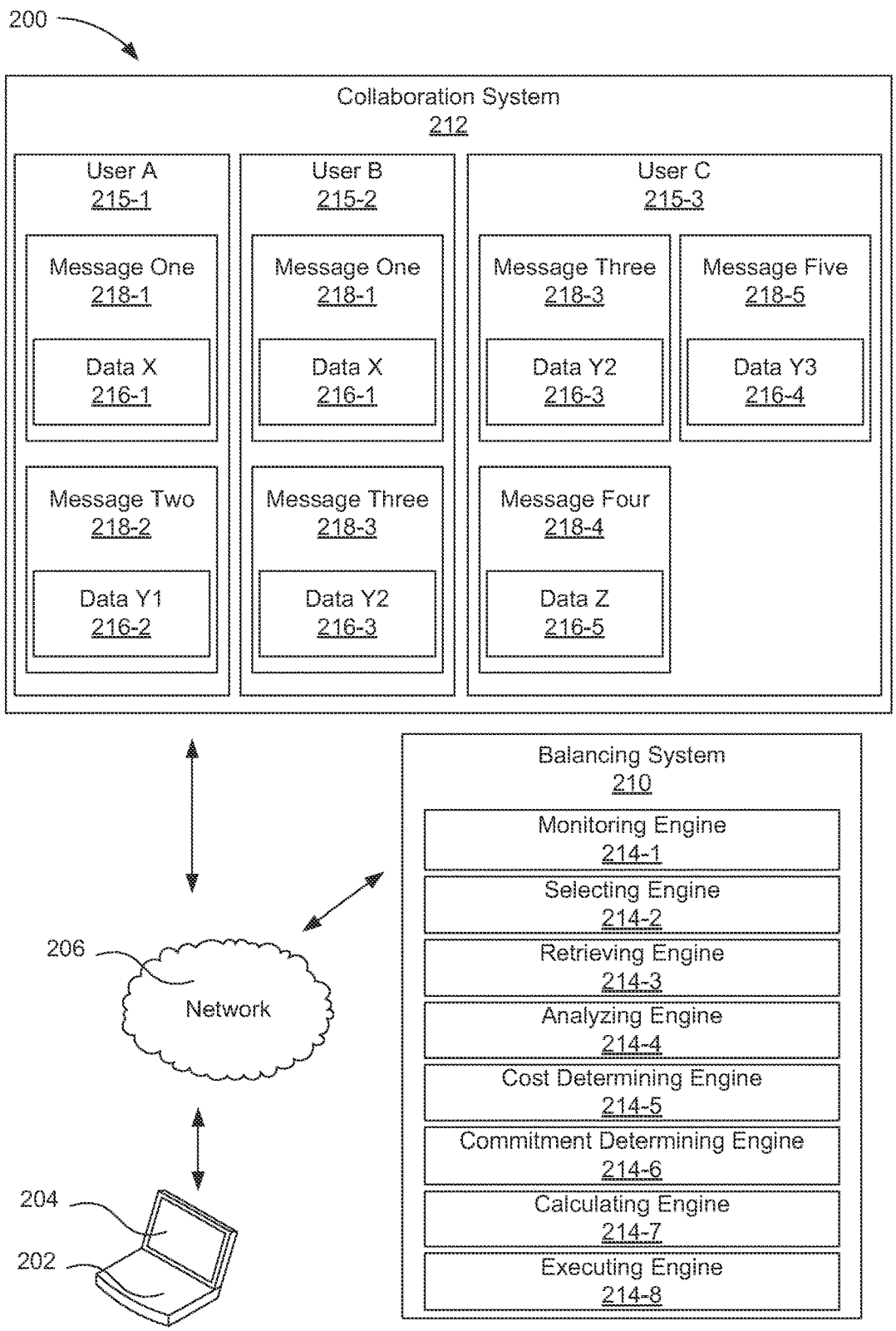
FIG. 2 is a diagram of an example of a system for balancing a workload based on commitments to projects, according to one example of principles described herein.

FIG. 2 is a diagram of an example of a system for balancing a workload based on commitments to projects, according to one example of principles described herein. As mentioned above, the balancing system is in communication with a network to monitor messages in a collaboration system, the messages representing correspondences between users of the collaboration system. The balancing system selects a number of the users associated with the collaboration system to form a group of users. Further, the balancing system retrieves the messages from each of the users in the group of users. The balancing system further analyzes data associated with the messages to determine which of the messages relate to at least one project. Further, the balancing system executes, based on a threshold, at least one action to optimize a workload for at least one user in the group of users for the at least one project.

As illustrated, the system (200) includes a collaboration system (212). As mentioned above, the collaboration system (212) may include a number of systems. The systems include an email system, a social network system, an IM system, or combinations thereof.

The email system includes a number of servers such as mail servers. The mail servers store information for users. The information may be messages such as email. The messages may include text, data, images, digital media, or combinations thereof.

The social network system is a network based application to enable a user to create a user account. Once the user account is created, the user establishes connections with other users, such as friends, family, and colleagues in an online environment. Further, once the user is connected with other users, the user may share information, in the form of messages, with each of the other users on the social network system by uploading pictures, updating personal information, updating status information, commenting on other user's information, among other activities. Further, the social network system may be an asynchronous social network or a synchronous social network. An asynchronous social network is a social network that allows a user to follow activities of other users. A synchronous social network is a social network that allows a user to establish connections with other users.

The IM system allows users to send or receive communication over the network (206) in the form of messages. The messages may be real-time transmission of text from a user to another user.

As illustrated, the collaboration system (212) includes a number of users (215). The collaboration system (212) includes user A (215-1), user B (215-2), and user C (215-3). Each of the users (215) has registered accounts with systems of the collaboration system (212).

Further, a number of messages (218) may be associated with each of the users (215). For example, message one (218-1) and message two (218-2) are associated with user A (215-1). Message one (218-1) and message three (218-3) are associated with user B (215-2). Message three (218-3), message four (218-4) and message five (218-5) are associated with user C (215-3). Each of the messages (218) may be associated with the email system, the social network system, or the IM system of the collaboration system (212).

Further, each of the messages (218) is associated with data (216). The data includes an owner. The owner specifies who owns the messages (218) in the collaboration system (212). The owner may be a single user or a group of users. Further, the data includes a sender. The sender specifies who sent the messages (218) in the collaboration system (212). The sender may be a single user or a group of users. The data includes recipients. The recipients specify who received the messages (218) in the collaboration system (212). The recipients may be a single user or a group of users. For example, user A (215-1) and user B (215-2) are the recipients of message one (218-1). The data includes a body of the message. The body of the message includes text, data, images, digital media, or combinations thereof. Further, the data includes other metadata. The other metadata includes a timestamp of when the message is sent by the sender to the recipient. Other metadata may include if the message is a private message, a confidential message, or a flagged message. Further, the other metadata may include if a message is associated with the email system, the social network system, or the IM system of the collaboration system (212). As illustrated, data X (216) is associated with message one (218-2). Data Y1 (216-2) is associated with message two (218-2). Data Y2 (216-3) is associated with message three (218-3). Data Z (216-5) is associated with message four (218-4). Further, data Y3 (216-4) is associated with message five (218-5).

As illustrated in FIG. 2, the system (200) includes a balancing system (210). The balancing system (210) may operate during a specific period of time. For example, the balancing system (210) may operate during a specific time of day, a specific month, a specific year, or combinations thereof. The balancing system (210) may reference a specific time frame such as yesterday, the last week, the last month, the last ninety days, other specific time frames, or combinations thereof. The balancing system (210) may operate on post-operative analysis. Further, the balancing system (210) may operate on specific messages. The specific messages may include unread messages, flagged messages, other specific messages, or combinations thereof. The balancing system (210) may be implemented on a single client device. However, the balancing system (210) may be implemented on a server to access the messages (218). Further, the balancing system (210) may include a number of features that may be accessed by specific users, managers, organizations, or systems. A policy of the balancing system (210) may determine which features may be accessed. A feature may include why types of messages the balancing system (210) is to monitor and/or retrieve.

Further, the balancing system (210) includes a number of engines (214). The engines (214) refer to a combination of hardware and program instructions to perform a designated function. Each of the engines (214) may include a processor and memory. The program instructions are stored in the memory and cause the processor to execute the designated function of the engine. As illustrated, the balancing system (210) includes a monitoring engine (214-1), a selecting engine (214-2), a retrieving engine (214-3), an analyzing engine (214-4), a cost determining engine (214-5), a commitment determining engine (214-6), a calculating engine (214-7), and an executing engine (214-8).

As mentioned above, the system (200) includes a monitoring engine (214-1). The monitoring engine (214-1) monitors messages (218) in a collaboration system (212). The messages (218) represent correspondences between users of the collaboration system (212). In an example, the balancing system (210) may not monitor specific messages. Specific messages may include private messages, confidential messages, flagged messages, or other specific messages, or combinations thereof. These specific messages may be labeled in a subject line or a header of the message by a user. Further, these specific messages may be sent from a confidential folder of the collaboration system (212). As a result, the balancing system (210) may not monitor specific messages. However, in other examples, the balancing system (210) may monitor all messages.

As mentioned above, the system (200) includes a selecting engine (214-2). The selecting engine (214-2) selects a number of the users associated with the collaboration system (212) to form a group of users. The selecting engine (214-2) may select users via a distribution list. The selecting engine (214-2) may select users via a network list. The selecting engine (214-2) may select users via a custom list. As will be described in FIG. 3, a UI may be presented, via a display (204), to a manager to allow the manager to select the group of users. In an example, once a manager logs onto the balancing system (210), the selecting engine (214-2) selects a group of users associated with the manager.

As mentioned above, the system (200) includes a retrieving engine (214-3). The retrieving engine (214-3) retrieves the messages (218) from each of the users in the group of users. The retrieving engine (214-3) retrieves data (216) from the messages (218). The data (216) includes an owner, a sender, recipients, a body of the message, other metadata, or combinations thereof.

The retrieving engine (214-3) may retrieve the messages (218) from each of the users in the group of users based on a time. For example, the specific time may include a specific year, month, day, hour, minute, second, other times, or combinations thereof. Further, the retrieving engine (214-3) may retrieve the messages from each of the users in the group of users based on an event. The event may include a creation of a message, a planned vacation of a user in the group of users, receiving a message, other events, or combinations thereof.

As mentioned above, the system (200) includes an analyzing engine (214-4). The analyzing engine (214-4) analyzes data (216) associated with the messages (218) to determine which of the messages (218) relate to at least one project. The analyzing engine (214-4) determines specific terms related to the at least one project. For example, if the at least one project is named project X and project X is associated with specific terms tools such as screwdriver, hammer, claw, and other tools, the analyzing engine (214-4) determines the specific terms related to project X are project X, tool, screwdriver, hammer and claw.

The analyzing engine (214-4) correlates the specific terms in each of the messages (218) to create a correlation. For example, the analyzing engine (214-4) correlates project X, screwdriver, hammer, and claw in each of the messages (218) to create a correlation. In an example, the correlation may be symbolic such as high, medium, or low. High indicates that the message has a strong correlation with the specific terms. Medium indicates that the message has a medium correlation with the specific terms. Low indicates that the message has a low correlation with the specific terms. In another example, the correlation may be a scale such as 0 to 10, where 0 indicates a low correlation and 10 indicates a high correlation.

The analyzing engine (214-4) determines, based on the correlation, a confidence metric, the confidence metric defining how each of the messages relate to the at least one project. In an example, the confidence metric may be a percentage defining how each of the messages relate to the at least one project based on the correlation. If the percentage is high, such as 90 percent, the confidence metric is used to determine that the correlation is accurate for the corresponding message. If the percentage is low, such as 30 percent, the confidence metric is used to determine that the correlation is not accurate for the corresponding message.

The analyzing engine (214-4) may utilize a feedback loop. The feedback loop may be used to refine a predicted workload based on an actual workload. For example, the analyzing engine (214-4) may have determined that each of the users in the group of users reads a message in a predicted average time of two minutes. As a result, the predicted workload is two minutes per message. However, the feedback loop may refine the predicted workload based on an actual workload. For example, each of the users in the group of users reads a message in an actual average time of one and a half minutes. As a result, the feedback loop may refine the predicted workload such that the predicted workload has the users in the group of users reading a message in an average time of one and a half minutes.

As mentioned above, the system (200) includes a cost determining engine (214-5). The cost determining engine (214-5) determines a cost for the at least one project. The cost determining engine (214-5) determines the cost based on a reading speed of each of the users. For example, if user A (215-1) reading speed is 150 words per minute (WPM) and a message is 1,500 words, user A (215-1) reads the message in ten minute. If user A (215-1) works an average of eight hours a day user A (215-1) spends 2.08 percent of their day reading the message. As a result, a cost of 2.08 percent of user A's workload for the day is determined. In other examples, the cost determining engine (214-5) determines the cost for the at least one project based on a monetary value. For example, if a user A's daily salary is two-hundred twenty dollars, the cost determining engine (214-5) determines the cost to for user A (215-1) to read the message is four dollars and fifty seven cents.

The cost determining engine (214-5) further determines the cost based on rules. The rules may specify that a message, such as an email, takes an average of ten minutes of a user to read. Further, the rules may specify that a message, such as a chat, takes an average of thirty seconds of a user to read. In other examples, the cost may be project specific.

As mentioned above, the system (200) includes a commitment determining engine (214-6). The commitment determining engine (214-6) determines a commitment for each of the users in the group of users for the at least one project. In an example, the commitment determining engine (214-6) determines a commitment for each of the users in the group of users for the at least one project based on a percentage of the workload. For example, if user A (215-1) is committed to project X and project Y, the commitment determining engine (214-6) determines fifty percent of user A's commitment is for project X and fifty percent of user A's commitment is for project Y. In other examples, the commitment determining engine (214-6) determines a commitment for each of the users in the group of users for the at least one project based on hours. If a user is committed to two projects and an average workday for the user is eight hours, four hours may be committed to each project.

Further, the commitment determining engine (214-6) may equally distribute the commitment to each of the users in the group of users for the at least one project. For example, if user A (215-1), user B (215-2), and user C (215-3) are committed to project X, the commitment determining engine (214-6) equally distributes the commitment each of the users in the group of users for the at least one project. In this example, user A's workload is committed to thirty-three percent of project X, user B's workload is committed to thirty-three percent of project X, and user C's workload is committed to thirty-three percent of project X.

As mentioned above, the system (200) includes a calculating engine (214-7). The calculating engine (214-7) calculates the threshold, the threshold representing a maximum of the commitment that each of the users specifies for the at least one project. The threshold may be based on current commitments a user has to other projects. For example, if user A (215-1) has fifty percent committed to project X and twenty-five percent committed to project Y, user A (215-1) may commit to 25 percent of another project. A commit to more than twenty-five percent of another project may exceed the threshold.

As mentioned above, the system (200) includes an executing engine (214-8). The executing engine (214-8) executes, based on a threshold, at least one action to optimize a workload for at least one user in the group of users for the at least one project.

The executing engine (214-8) executes, based on the threshold, the at least one action to optimize the workload for the at least one user in the group of users for the at least one project by optimizing the workload based on future meetings for each of the users in the group of users. For example, if user A (215-1) and user B (215-2) form the group of users, the executing engine (214-8) may access a system that defines future meetings for user A (215-1) and user B (215-2). If user A (215-1) has three future meetings and user B (215-2) has no future meeting, the executing engine (214-8) executes an action to optimize the workload for user A (215-1) and user B (215-2). The action may include redirecting messages for a specific project user A (215-1) and user B (215-2) are working on to user B (215-2).

Further, the executing engine (214-8) executes, based on the threshold, the at least one action to optimize the workload for the at least one user in the group of users for the at least one project by optimizing the workload based on calendar for each of the users in the group of users. For example, the executing engine (214-8) may access a calendar associated with user A (215-1) and user B (215-1). The calendar may indicate that user A (215-1) is going on vacation in the near future. As a result, user A's workload may be reduced in the near future. The executing engine (214-8) executes an action to optimize the workload for user A (215-1) and user B (215-2). The action may include redirecting messages for a specific project user A (215-1) and user B (215-2) are working on to user B (215-2) while user A (215-1) is on vacation.

Further, the executing engine (214-8) executes, based on the threshold, the at least one action to optimize the workload for the at least one user in the group of users for the at least one project by optimizing the workload based on future deliverables for each of the users in the group of users. A deliverable may be a tangible or intangible object produced as a result of a task associated with a project. The deliverable may be a document, such as a report. In an example, the executing engine (214-8) may determine user A (215-1) has a future deliverable in one day and user B (215-1) has a future deliverable in five days. Due to the future deliverables, it may be desirable to reduce user A's workload for a day. The executing engine (214-8) executes an action to optimize the workload for user A (215-1) and user B (215-2). The action may include redirecting messages for a specific project user A (215-1) and user B (215-2) are working on to user B (215-2) while user A (215-1) is finishing the future deliverable.

The action may be based on a prediction, such as a future event. For example, if the executing engine (214-8) detects user A (215-1) reschedules a vacation that might affect user A's commitment to a project, the executing engine (214-8) may calculate a new commitment for user A (215-1) with regard to the project. Further, the executing engine (214-8) may inform user A (215-1) of potential issues and mitigation with regard to the project due to the vacation.

Further, the action may be based on the cost. For example, if a message can be reassigned to user A (215-1) or user B (215-2), the executing engine (214-8) may reassign the message to user A (215-1) if user A (215-1) can read the message faster than user B (215-2).

In an example, the at least one action includes reassigning at least one of the messages to at least one other of the users in the group of users. For example, if user A (215-1) and user B (215-2) form the group of users and a message is sent to user A (215-1). The action may include reassigning the message to user B (215-1). In other examples, the at least one action includes reassigning at least one of the messages to a user not associated with the group of users. The user not associated with the group of users may be qualified to handle the message. For example, the action may reassign the message to user C (215-3).

Further, the at least one action includes sending a notification to the group of users. The notification may notify the group of users that rebalancing of the workload for tasks of a project are needed to be rebalanced. The notification may notify the group of users that one of the user's commitments to another project is impacting the project.

The at least one action includes hiding the at least one of the messages from a user in the group of users. The action may hide a message that is not relevant to a project the group of users is working on.

Further, the at least one action includes rebalancing the workload to meet a minimum or a maximum of the threshold by adjusting time spent on tasks of the project for each of the users in the group of users. For example, if user A's minimum threshold is twenty percent and the maximum threshold is fifty percent for tasks of a project, the action may adjust time spent on the tasks of the project until user A's thresholds are met. Such a system (200) allows an action to be executed, based on a threshold, to optimize the workload for at least one user in a group of users. As a result, the workload for the user in the group of users is rebalanced.

An overall example of the system (200) will now be described. The monitoring engine (214-1) monitors messages (218) in a collaboration system (212). For example, the monitoring engine (214-1) monitors the creation and delivery of the messages (218).

The selecting engine (214-2) selects a number of the users associated with the collaboration system (212) to form a group of users. The selecting engine (214-2) selects user A (215-1), user B (215-2), and user C (215-3). As a result, user A (215-1), user B (215-2), and user C (215-3) form the group of users.

The retrieving engine (214-3) retrieves the messages from each of the users in the group of users. For example, message one (218-1) and message two (218-2) are retrieved from user A (215-1). Message one (218-1) and message three (218-3) are retrieved from user B (215-2). Message three (218-3), message four (218-4) and message five (218-5) are retrieved from user C (215-3).

The analyzing engine (214-4) analyzes data (216) associated with the messages (218) to determine which of the messages relate to project X, project Y, and project Z. The analyzing engine (214-4) analyzes the data (216) associated with the messages (218) to determine which of the messages (218) relate to project X, project Y, and project Z by determining specific terms related to project X, correlating the specific terms in each of the messages to create a correlation, and determining, based on the correlation, a confidence metric, the confidence metric defining how each of the messages relate to project X, project Y, and project Z. In this example, message one (218-1) relates to project X, message two (218-2), message three (218-3) and message five (218-5) relate to project Y, and message four (218-4) relates to project Z.

The cost determining engine (214-5) determines a cost for project X, project Y, and project Z. The cost is based on a reading speed of each of the users, based on rules, or combinations thereof. The cost may be determined as described above.

The commitment determining engine (214-6) determines a commitment for each of the users in the group of users for project X, project Y and project Z. In this example, user A's commitment is 50 percent to project X and 50 percent to project Y. user B's commitment is 50 percent to project X and 50 percent to project Y. User's C commitment is 100 percent to project Y and 50 percent to project Z.

The calculating engine (214-7) calculates the threshold. The threshold represents a maximum of the commitment that each of the users specify for project X, project Y and project Z. In this example, the threshold that user A (215-1) specifies is 50 percent to project X and 50 percent to project Y. The threshold that user B (215-2) specifies is 50 percent to project X and 50 percent to project Y. The threshold that user C (215-3) specifies is 50 percent to project Y and 50 percent to project Z.

The executing engine (214-8) executes, based on a threshold, at least one action to optimize a workload for at least one user in the group of users for the project X, project Y and project Z. The executing engine (214-8) determines project Y exceeds the threshold for user C (215-3). In this example, the executing engine (214-8) executes an action to hide message three (216-3) from user C (215-3). Such a system (200) allows an action to be executed, based on a threshold, to optimize the workload for at least one user in a group of users. As a result, the workload for the user in the group of users is rebalanced.

Figure 3:
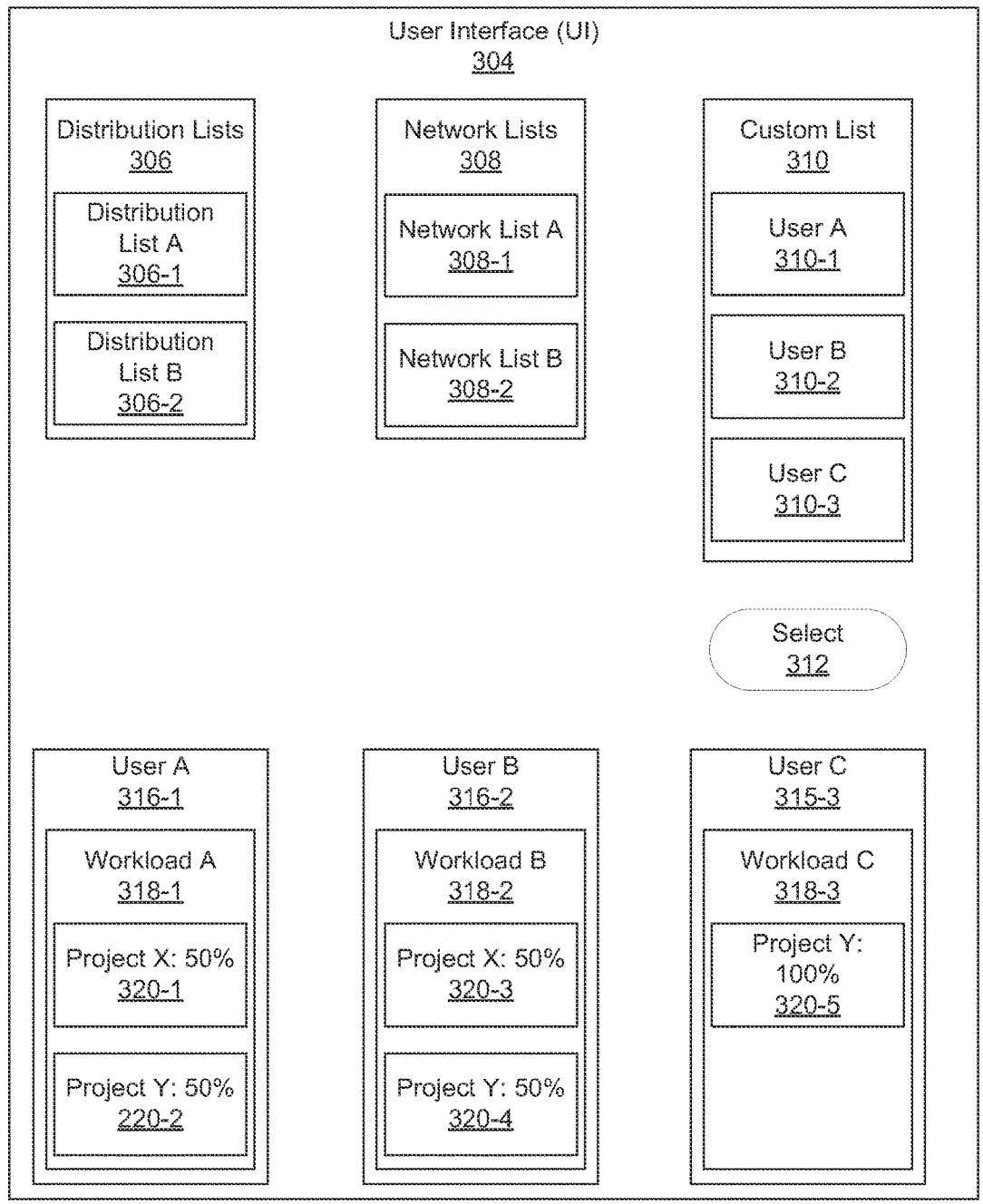
FIG. 3 is a diagram of an example of a user interface (UI) for selecting a group of users and displaying workloads for the group of users, according to one example of principles described herein.

FIG. 3 is a diagram of an example of UI for selecting a group of users and displaying workloads for the group of users, according to one example of principles described herein. As will be described below, a UI is presented to a manger to allow a manager to select a group of users. Further, the UI displays the workload of each user in the group of users to the manager.

As illustrated, the UI (304) includes a number of lists (306, 308, 310). Each of the lists (306, 308, 310) correspond to a specific group of users. The distribution lists (306) may include distribution list A (306-1) and distribution list B (306-2).

Distribution list A (306-1) may define specific users of a collaboration system. If the manager selects distribution list A (306-1) and then a select button (312), the users associated with distribution list A (306-1) forms the group of users. Distribution list B (306-2) may define specific users of a collaboration system and differs from distribution list A (306-1). If the manager selects distribution list B (306-2) and then the select button (312), the users associated with distribution list B (306-2) forms the group of users.

Network list A (308-1) may define specific users of a collaboration system. If the manager selects network list A (306-2) and then the select button (312), the users associated with network list A (308-1) forms the group of users. Network list B (308-2) may define specific users of a collaboration system and differs from network list A (308-1). If the manager selects network list B (308-2) and then the select button (312), the users associated with network list B (308-2) forms the group of users.

The custom list (310) may allow the manager to select specific users of a collaboration system. If the manager selects user A (310-1) and then the select button (312), user A (310-1) forms the group of users. Similarly, if the manager selects user A (310-1), user B (310-2), and user C (310-3) and then the select button (312), user A (310-1), user B (310-2), and user C (310-3) forms the group of users. As a result, the UI (304) allows a manager to select a group of users.

While this example has been described with reference to a manager selecting users to form a group of users, other users associated with an organization may select the users to form the group of users. For example, a team leader may select the users, via the UI, to form the group of users.

As illustrated, the UI (304) displays, to a manager, the workload (318) for each user (316) in the group of users. In an example, user A (316-1), user B (316-2), and user C (316-3) forms the group of users. User A (316-1) is associated with workload A (318-1). As illustrated, workload A (318-1) indicates 50 percent of user A's workload is dedicated to project X (320-1) and 50 percent is dedicated to project Y (320-2). User B (316-2) is associated with workload B (318-2). As illustrated, workload B (318-2) indicates 50 percent of user B's workload is dedicated to project X (320-3) and 50 percent is dedicated to project Y (320-3). User C (316-3) is associated with workload C (318-3). As illustrated, workload C (318-3) indicates 100 percent of user C's workload is dedicated to project Y (320-5). As a result, the manager is able to visually see that all of the user's workloads are at full capacity.

While this example, has been described with reference to the group of user may be selected via a distribution list, a custom list, a network list, the group of users may be selected via other lists. For example, the group of users may be selected via a project team list, an expertise list, other lists, or combinations thereof.

Figure 4:
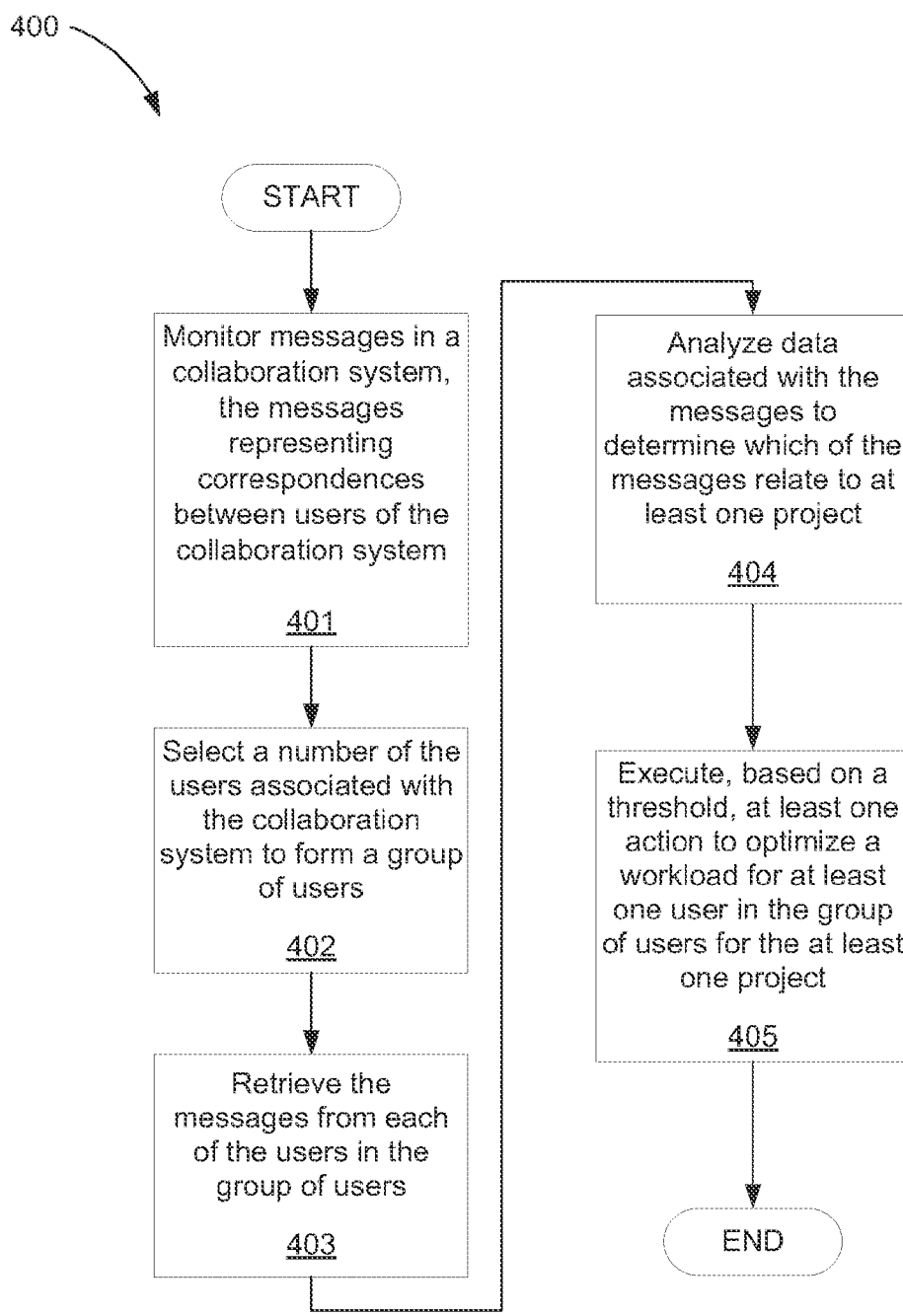
FIG. 4 is a flowchart of an example of a method for balancing a workload based on commitments to projects, according to one example of principles described herein.

FIG. 4 is a flowchart of an example of a method for balancing a workload based on commitments to projects, according to one example of principles described herein. In one example, the method (400) may be executed by the balancing system (100) of FIG. 1. In other examples, the method (400) may be executed by other systems (i.e. system 200, system 600, and system 700). In this example, the method (400) includes monitoring (401) messages in a collaboration system, the messages representing correspondences between users of the collaboration system, selecting (402) a number of the users associated with the collaboration system to form a group of users, retrieving (403) the messages from each of the users in the group of users, analyzing (404) data associated with the messages to determine which of the messages relate to at least one project, and executing (405), based on a threshold, at least one action to optimize a workload for at least one user in the group of users for the at least one project.

As mentioned above, the method (400) includes monitoring (401) messages in a collaboration system, the messages representing correspondences between users of the collaboration system. The method (400) may monitor the messages in the collaboration system as described above.

As mentioned above, the method (400) includes selecting (402) a number of the users associated with the collaboration system to form a group of users. In an example, a UI may be presented to a manager to allow a manager to select the group of users. The manager may select the group of users based on a distribution list, a network list, or a custom list.

As mentioned above, the method (400) includes retrieving (403) the messages from each of the users in the group of users. The method (400) may retrieve unread messages from each of the users in the group of users. Further, the method (400) may not retrieve private messages, confidential messages, flagged messages, or combinations thereof.

As mentioned above, the method (400) includes analyzing (404) data associated with the messages to determine which of the messages relate to at least one project. The method (400) analyzes the data associated with the messages by determining which of the messages relate to at least one project by determining specific terms related to the at least one project, correlating the specific terms in each of the messages to create a correlation, and determining, based on the correlation, a confidence metric, the confidence metric defining how each of the messages relate to the at least one project.

In some examples, the method (400) utilizes natural language processing (NLP) to analyze the data associated with the messages to determine which of the messages relate to the at least one project. The NLP may derive meaning form the messages via a number of methods and techniques. By deriving meaning from the messages, NLP may be used to determine which of the messages relate to the at least one project.

As mentioned above, the method (400) includes executing (405), based on a threshold, at least one action to optimize a workload for at least one user in the group of users for the at least one project. The method (400) may optimize the workload based on future meetings for each of the users in the group of users, a calendar for each of the users in the group of users, future deliverables for each of the users in the group of users, or combinations thereof. Further the at least one action includes reassigning at least one of the messages to at least one other of the users in the group of users, sending a notification to the group of users, hiding the at least one of the messages from the at least one user in the group of users, rebalancing the workload to meet a minimum or a maximum of the threshold by adjusting time spent on tasks of the at least one project for each of the users in the group of users, combinations thereof.

Figure 5:
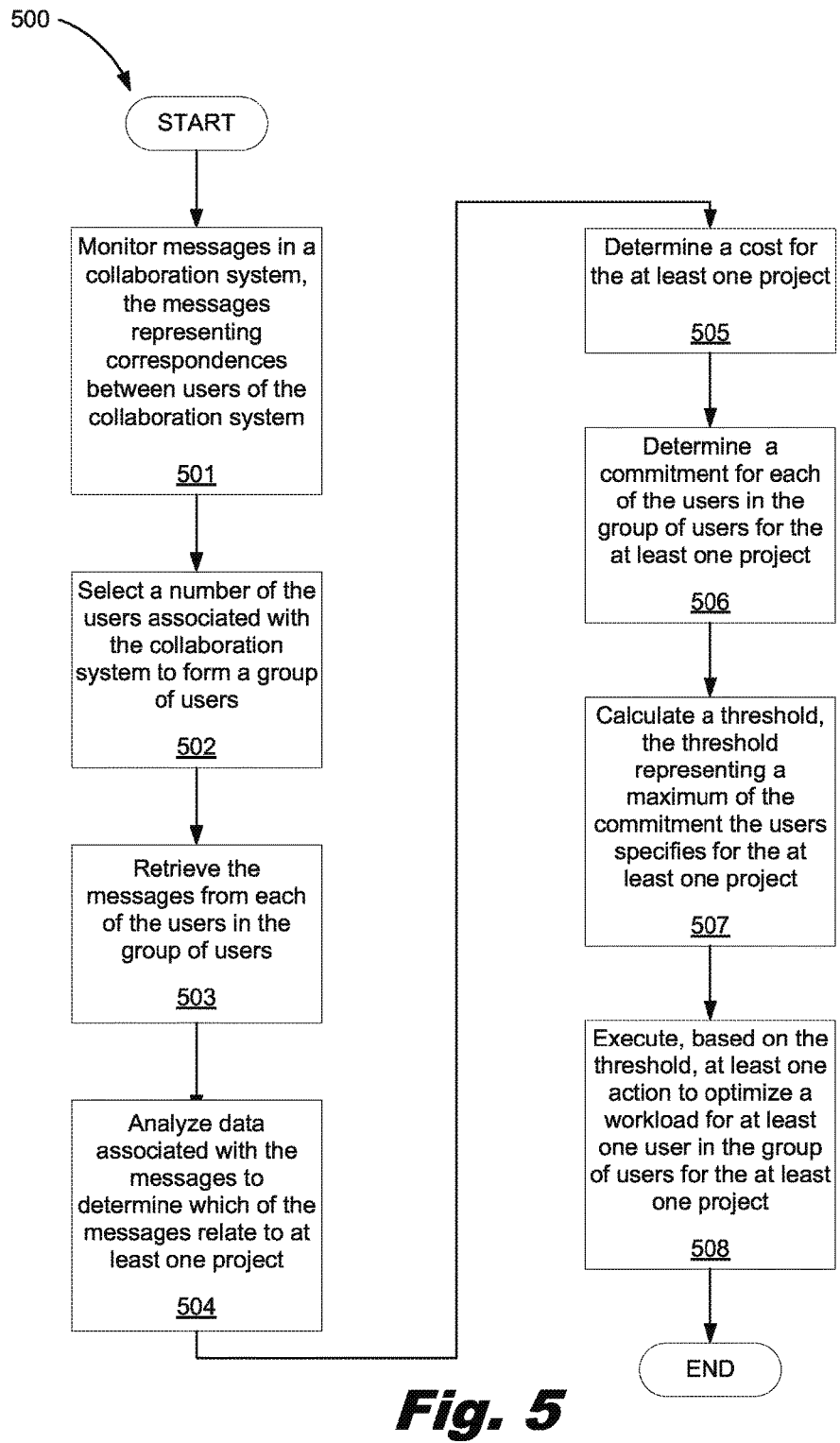
FIG. 5 is a flowchart of an example of a method for balancing a workload based on commitments to projects, according to one example of principles described herein.

FIG. 5 is a flowchart of an example of a method for balancing a workload based on commitments to projects, according to one example of principles described herein. In one example, the method (500) may be executed by the balancing system (100) of FIG. 1. In other examples, the method (500) may be executed by other systems (i.e. system 200, system 600, and system 700). In this example, the method (500) includes monitoring (501) messages in a collaboration system, the messages representing correspondences between users of the collaboration system, selecting (502) a number of the users associated with the collaboration system to form a group of users, retrieving (503) the messages from each of the users in the group of users, analyzing (504) data associated with the messages to determine which of the messages relate to at least one project, determining (505) a cost for the at least one project, determining (506) a commitment for each of the users in the group of users for the at least one project, calculating (507) the threshold, the threshold representing a maximum of the commitment that each of the users specifies for the at least one project, and executing (508), based on the threshold, at least one action to optimize a workload for at least one user in the group of users for the at least one project.

As mentioned above, the method (500) includes determining (505) a cost for the at least one project. The cost is based on a reading speed of each of the users, based on rules, or combinations thereof.

As mentioned above, the method (500) determining (506) a commitment for each of the users in the group of users for the at least one project. The commitment may be based on a percentage of the workload.

As mentioned above, the method (500) calculating (507) a threshold, the threshold representing a maximum of the commitment that each of the users specifies for the at least one project. The threshold may be a minimum of zero percent and a maximum of one-hundred percent. Further, the threshold may be specific for each of the users in the group of users.

Figure 6:
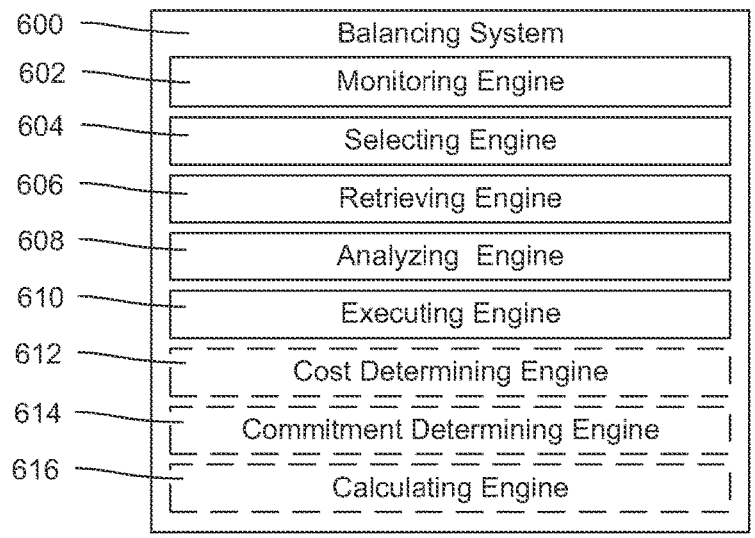
FIG. 6 is a diagram of an example of a balancing system, according to the principles described herein.

FIG. 6 is a diagram of an example of a balancing system, according to the principles described herein. The balancing system (600) includes a monitoring engine (602), a selecting engine (604), a retrieving engine (606), an analyzing engine (608), and an executing engine (610). In this example, the balancing system (600) also includes a cost determining engine (612), a commitment determining engine (614), and a calculating engine (616). The engines (602, 604, 606, 608, 610, 612, 614, 616) refer to a combination of hardware and program instructions to perform a designated function. Each of the engines (602, 604, 606, 608, 610, 612, 614, 616) may include a processor and memory. The program instructions are stored in the memory and cause the processor to execute the designated function of the engine.

The monitoring engine (602) monitors messages in a collaboration system, the messages representing correspondences between users of the collaboration system. In one example, the monitoring engine (602) monitors all messages in the collaboration system. In another example, the monitoring engine (602) monitors specific messages in the collaboration system.

The selecting engine (604) selects a number of the users associated with the collaboration system to form a group of users. The selecting engine (604) presents a UI to allow a manager to select a group of user. The group of users may be selected via a distribution list, a network list, a custom list, or combinations thereof.

The retrieving engine (606) retrieves the messages from each of the users in the group of users. The retrieving engine (606) may retrieve unread messages from each of the users in the group of user. The retrieving engine (606) may retrieve flagged messages from each of the users in the group of user.

The analyzing engine (608) analyzes data associated with the messages to determine which of the messages relate to at least one project. The analyzing engine (608) analyzes data of the messages such as owners, senders, recipients, a body for each of the messages, metadata, or combinations thereof. The analyzing engine (608) analyzes the data associated with the messages to determine which of the messages relate to at least one project by determining specific terms related to the at least one project, correlating the specific terms in each of the messages to create a correlation, and determining, based on the correlation, a confidence metric, the confidence metric defining how each of the messages relate to the at least one project.

The executing engine (610) executes, based on a threshold, at least one action to optimize a workload for at least one user in the group of users for the at least one project. The executing engine (610) executes, based on the threshold, the at least one action to optimize the workload for the at least one user in the group of users for the at least one project by optimizing the workload based on future meetings for each of the users in the group of users, a calendar for each of the users in the group of users, future deliverables for each of the users in the group of users, or combinations thereof.

Further, the at least one action includes reassigning at least one of the messages to at least one other of the users in the group of users, sending a notification to the group of users, hiding the at least one of the messages from a user in the group of users, rebalancing the workload to meet a minimum or a maximum of the threshold by adjusting time spent on tasks of the project for each of the users in the group of users, combinations thereof.

The cost determining engine (612) determines a cost for the at least one project. The cost is based on a reading speed of each of the users, based on rules, or combinations thereof.

The commitment determining engine (614) determines a commitment for each of the users in the group of users for the at least one project. The commitment is based on a percentage of the workload.

The calculating engine (616) calculates the threshold. The threshold represents a maximum of the commitment that each of the users specifies for the at least one project.

Figure 7:
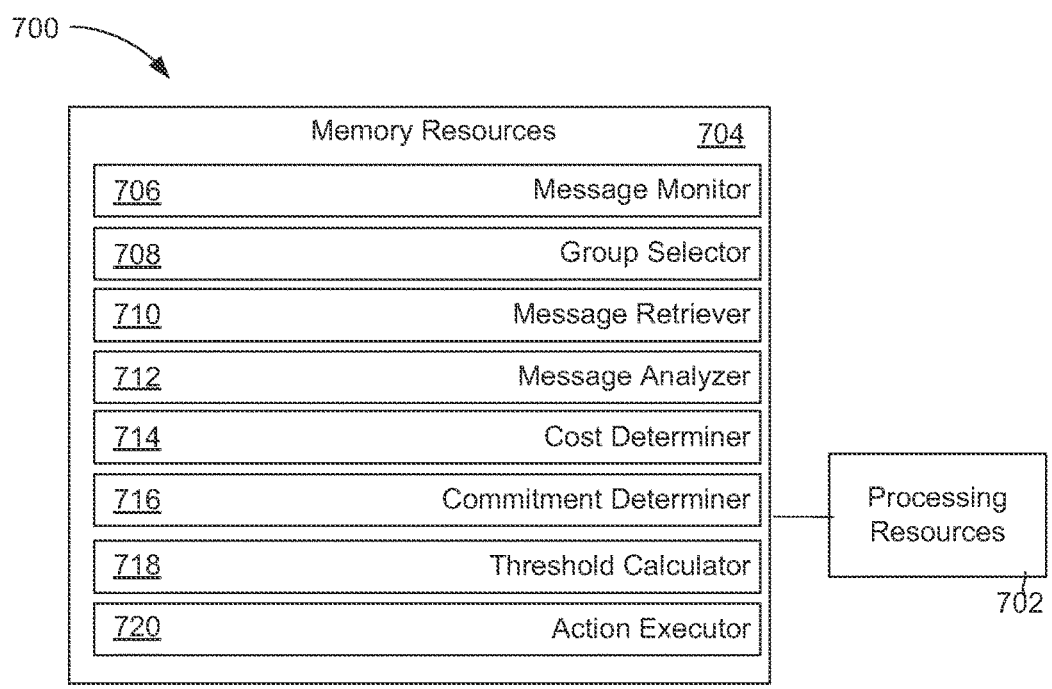
FIG. 7 is a diagram of an example of a balancing system, according to the principles described herein.

FIG. 7 is a diagram of an example of a balancing system, according to the principles described herein. In this example, the balancing system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the balancing system (700). The programmed instructions shown stored in the memory resources (704) include a message monitor (706), a group selector (708), a message retriever (710), a message analyzer (712), a cost determiner (714), a commitment determiner (716), a threshold calculator (718), and an action executor (720).

The memory resources (704) include a computer readable storage medium that contains computer readable program code to cause tasks to be executed by the processing resources (702). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The message monitor (706) represents programmed instructions that, when executed, cause the processing resources (702) to monitor messages in a collaboration system, the messages representing correspondences between users of the collaboration system. The group selector (708) represents programmed instructions that, when executed, cause the processing resources (702) to select a number of the users associated with the collaboration system to form a group of users.

The message retriever (710) represents programmed instructions that, when executed, cause the processing resources (702) to retrieve the messages from each of the users in the group of users. The message analyzer (712) represents programmed instructions that, when executed, cause the processing resources (702) to analyze data associated with the messages to determine which of the messages relate to at least one project.

The cost determiner (714) represents programmed instructions that, when executed, cause the processing resources (702) to determine a cost for the at least one project. The commitment determiner (716) represents programmed instructions that, when executed, cause the processing resources (702) to determine a commitment for each of the users in the group of users for the at least one project.

The threshold calculator (718) represents programmed instructions that, when executed, cause the processing resources (702) to calculate a threshold, the threshold representing a maximum of the commitment that each of the users specifies for the at least one project. The action executor (720) represents programmed instructions that, when executed, cause the processing resources (702) to execute, based on the threshold, at least one action to optimize a workload for at least one user in the group of users for the at least one project.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, balancing system (700) may be implemented on a user device, on a server, on a collection of servers, or combinations thereof.

The balancing system (700) of FIG. 7 may be part of a general purpose computer. However, in alternative examples, the balancing system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A method for balancing a workload in responding to incoming messages regarding a specific project with which a group of multiple users is associated, the method comprising, with a server having a network interface for connecting, via a computer network, to an electronic collaboration system that supports a distributed population of collaborating users, performing all of:
monitoring messages in the collaboration system;
selecting a number of the users associated with the specific project in the collaboration system to form the group of multiple users, wherein the group comprises at least a first user;
analyzing data associated with the messages to determine which of the messages relate to the specific project;
measuring an amount of time taken by the first user to process a message related to the specific project;
determining a commitment level for each user in the group of multiple users associated with the specific project;
determining a commitment level for the first user based on the amount of time taken by the first user to process the message related to the specific project; and
reassigning a message related to the specific project in the collaboration system from the first user to a different user in the group based on a comparison of the commitment levels of the users in the group of users associated with the specific project to rebalance the workload in responding to incoming messages among the group of users.

2. The method of claim 1, further comprising hiding at least one of the messages from at least one user in the group of users based on the relative commitment levels of the user.

3. The method of claim 1, in which the data of the messages comprises owners, senders, recipients, a body for each of the messages, metadata, or combinations thereof.

4. The method of claim 1, in which analyzing the data associated with the messages to determine which of the messages are relate to the specific project comprises:
determining specific terms related to the specific project;
correlating the specific terms in each of the messages to create a correlation; and
determining, based on the correlation, a confidence metric indicating a confidence level that each of the messages relate to the specific project.

5. The method of claim 1, further comprising determining a cost for the specific project, in which the cost is based on a reading speed of each of the users.

6. The method of claim 1, wherein determining the commitment level for each of the users in the group of users for the specific project is based on a percentage of the workload.

7. The method of claim 1, further comprising comparing relative commitment levels of the user based on a maximum of a commitment that each of the users specifies for the at specific project.

8. The method of claim 1, wherein the monitoring further comprising monitoring messages in both an email system and a social network system.

9. The method of claim 1, wherein the monitoring further comprising monitoring messages in both an email system and an instant messaging system.

10. The method of claim 1, wherein the monitoring does not include messages that are flagged or marked as private or confidential.

11. The method of claim 1, further comprising quantifying a cost of having the first user process a message.

12. The method of claim 1, further comprising reassigning a message from the first user to a second user who processes messages more quickly than the first user.

13. The method of claim 1, further comprising:
with the network interface, accessing electronic calendar systems for the users in the group;
using a number of future appointments a first user has in determining a commitment level for the first user; and
redirecting a message from the first user with more future appointments to a second user with fewer future appointments.

14. The method of claim 1, further comprising:
with the network interface, accessing electronic calendar systems for the users in the group;
using a planned vacation of a first user in determining a commitment level for the first user; and
redirecting a message from a first user who has a planned vacation to a second user.

15. The method of claim 1, further comprising:
with the network interface, accessing data about future deliverables of each user in the group;
using a number of future deliverables that a first user has in determining a commitment level for the first user; and
redirecting a message from a first user with more future deliverables to a second user with fewer future deliverables.

16. A method for balancing a workload in responding to incoming messages regarding a specific project with which a group of multiple users is associated, the method comprising, with a server having a network interface for connecting, via a computer network, to an electronic collaboration system that supports a distributed population of collaborating users, performing all of:
monitoring messages incoming to the group of multiple users, wherein the group comprises at least a first user;
analyzing data associated with the messages to determine which of the messages relate to the specific project;
measuring an amount of time taken by the first user to process a message related to the specific project;
determining a relative workload for each of the users in the group;
determining a relative workload for the first user based on the amount of time taken by the first user to process the message related to the specific project; and
executing, based on relative workloads, at least one action to optimize a workload for at least one user in the group of users for the specific project, including reassigning a message related to the project from first user to a second user in the group of users associated with the specific project;
wherein the reassigning comprising reassigning a message from the first user to the second user when the first user has more future meetings scheduled than the second user;
wherein the reassigning comprising reassigning a message from the first user to the second user when the first user has a planned vacation; and wherein the reassigning comprising reassigning a message from the first user to the second user when the first user has more future deliverables than the second user.

17. The method of claim 16, wherein the monitoring does not include messages that are flagged or marked as private or confidential.

18. The method of claim 16, further comprising reassigning a message from the first user to a second user who processes messages more quickly than the first user.

\* \* \* \* \*